US008539675B2

(12) United States Patent
Jung

(10) Patent No.: US 8,539,675 B2
(45) Date of Patent: Sep. 24, 2013

(54) METHOD FOR MANUFACTURING A TAPERED STABILIZER BAR HAVING A CONTINUOUSLY CHANGING CROSS-SECTION

(75) Inventor: Chan-Gi Jung, Seoul (KR)

(73) Assignee: Dae Won Kang Up Co., Ltd., Seoul (KR)

( * ) Notice: Subject to any disclaimer, the term of this patent is extended or adjusted under 35 U.S.C. 154(b) by 312 days.

(21) Appl. No.: 13/023,272

(22) Filed: Feb. 8, 2011

(65) Prior Publication Data

US 2011/0119920 A1    May 26, 2011

Related U.S. Application Data

(62) Division of application No. 12/279,938, filed as application No. PCT/KR2006/002308 on Jun. 16, 2006, now Pat. No. 7,984,918.

(30) Foreign Application Priority Data

Feb. 21, 2006  (KR) .................. 10-2006-0016851

(51) Int. Cl.
   *B60G 21/055*   (2006.01)
(52) U.S. Cl.
   USPC .............. 29/897.2; 72/370.13; 72/370.25; 267/188
(58) Field of Classification Search
   USPC ............ 29/897, 897.2; 72/370.1, 370.11, 72/370.12, 370.13, 370.23, 370.24, 370.25, 72/370.26; 267/154, 273, 188
   See application file for complete search history.

(56) References Cited

U.S. PATENT DOCUMENTS

| 557,791 A * | 4/1896 | Findlay .......................... 72/85 |
| 4,033,605 A | 7/1977 | Smith et al. |
| 4,138,141 A | 2/1979 | Andersen |
| 4,146,249 A | 3/1979 | Paul |
| 4,378,122 A | 3/1983 | Ohno et al. |
| 4,429,899 A | 2/1984 | Ohno et al. |
| 4,469,349 A | 9/1984 | Tomita et al. |
| 4,869,480 A | 9/1989 | Beutin et al. |
| 5,491,996 A | 2/1996 | Baarman et al. |
| 5,810,338 A | 9/1998 | Koenig et al. |
| 6,196,530 B1 | 3/2001 | Muhr et al. |
| 6,318,710 B1 | 11/2001 | Anderson et al. |
| 6,513,243 B1 * | 2/2003 | Bignucolo et al. ........... 29/897.2 |
| 7,028,998 B2 | 4/2006 | Daily et al. |
| 7,044,458 B2 * | 5/2006 | Daily et al. .................. 267/149 |
| 2007/0257462 A1 | 11/2007 | Fader |

FOREIGN PATENT DOCUMENTS

JP         10-35238 A      2/1998

* cited by examiner

*Primary Examiner* — David Bryant
*Assistant Examiner* — Jason L Vaughan
(74) *Attorney, Agent, or Firm* — Arent Fox LLP

(57) ABSTRACT

A method for manufacturing a stabilizer bar for a vehicle includes cutting a stabilizer bar material having a round bar-shaped configuration, heating both end portions of the cut stabilizer bar material to be formed as leg bars of the stabilizer bar, rolling both side surfaces of each of both heated end portions of the stabilizer bar material so that both side surfaces are tapered, rotating the stabilizer bar material about an axis thereof between rollers to taper both remaining non-rolled side surfaces of each of both end portions of the stabilizer bar material to be formed as the leg bars of the stabilizer bar, so that each or both end portions of the stabilizer bar material has an elliptical cross-section, forming eyes on distal ends of the stabilizer bar material, and bending the stabilizer bar material into the shape of the stabilizer bar.

3 Claims, 4 Drawing Sheets

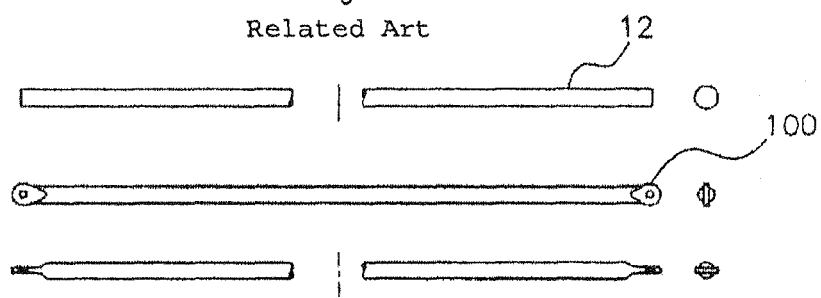
Fig. 1
Related Art
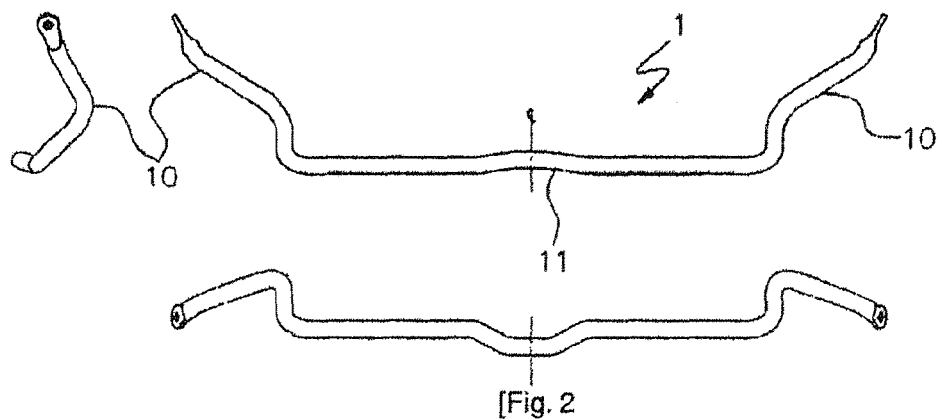
[Fig. 2]
Related Art
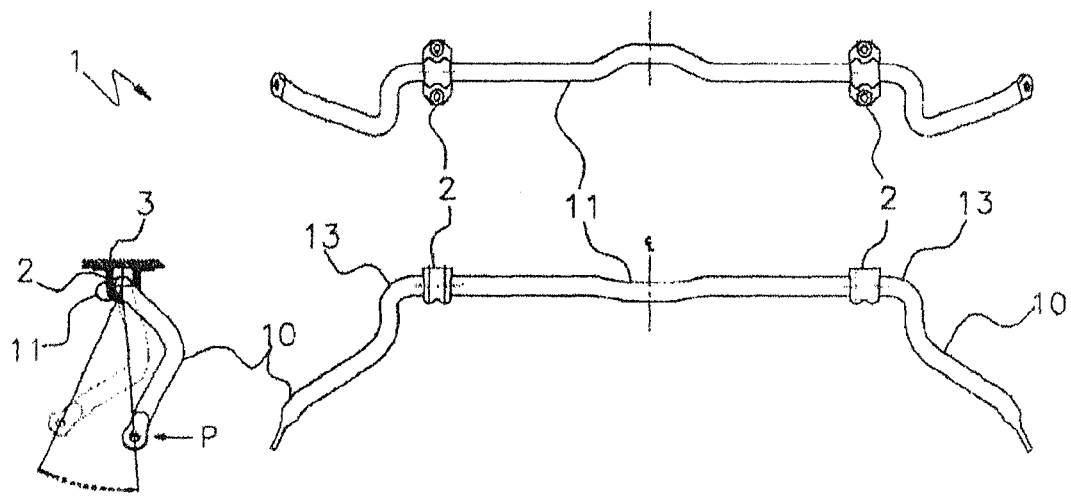

Fig. 8
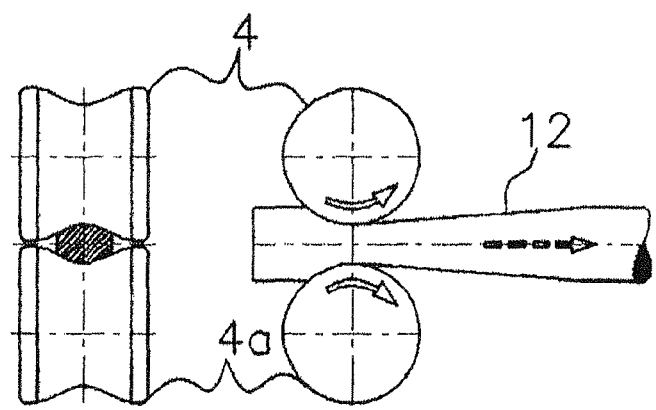
(A)
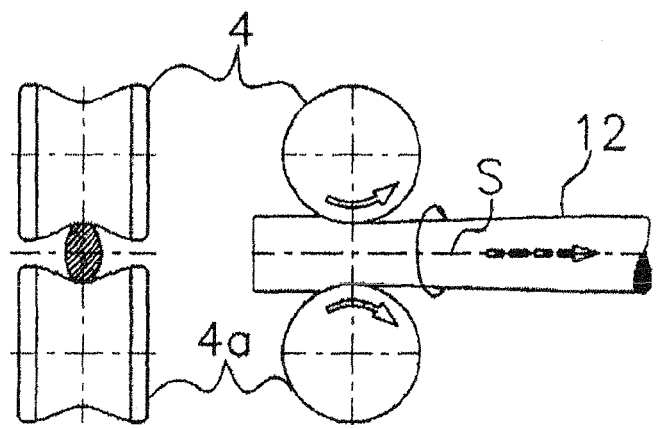
(B)

METHOD FOR MANUFACTURING A TAPERED STABILIZER BAR HAVING A CONTINUOUSLY CHANGING CROSS-SECTION

CROSS REFERENCE TO RELATED APPLICATION

This application is a division of U.S. patent application Ser. No. 12/279,938, filed Aug. 19, 2008, now U.S. Pat. No. 7,984,918 which is a National Stage entry of International Application No. PCT/KR2006/002308, filed Jun. 16, 2006, the entire specification claims and drawings of which are incorporated herewith by reference.

FIELD OF THE INVENTION

The present invention relates to a tapered stabilizer bar having a continuously changing cross-section and a method for manufacturing the same, and more particularly to a tapered stabilizer bar having a continuously changing cross-section in which a leg bar is tapered from the upper end toward the lower end thereof to continuously decrease the section modulus of the leg bar from the upper end toward the lower end so that the stress generated by a load applied to the lower end of the leg bar is not concentrated on the bent part of the stabilizer bar and is distributed over the entire leg bar so as to prevent the stabilizer bar from being broken at the bent part, and which allows material for the stabilizer bar to be saved so that the weight of the stabilizer bar decreases, thereby contributing to the reduction in the weight and the manufacturing cost of a vehicle, and a method for manufacturing the same.

BACKGROUND OF THE INVENTION

FIG. 1 provides views illustrating the steps of a method for manufacturing a conventional stabilizer bar, and FIG. 2 is a view illustrating a state in which the conventional stabilizer bar is mounted in place. Referring to FIG. 1, the conventional stabilizer bar 1 is manufactured by cutting a stabilizer bar material 12 having a round bar-shaped configuration with a circular cross-section, forming eyes 100 through forging both ends of the stabilizer bar material 12, and bending the stabilizer bar material 12 into the shape of a stabilizer bar 1. At this time, referring to FIG. 2, the leg bar 10 of the conventional stabilizer bar 1 is formed to have the same circular cross-section through the entire length thereof. The stabilizer bar 1 manufactured as described is mounted such that the parallel bar of the stabilizer bar 1 is secured with respect to a frame 3 via fasteners 2 in each of which a bush is fitted, and the leg bars 10 of the stabilizer 1 extend from both ends of the parallel bar 11 with the distal ends of the leg bars 10 connected to suspension arms (not shown). The stabilizer bar 1 is used to control a rolling phenomenon which occurs due to the tilt of a vehicle body. When the stabilizer bar 1 is mounted as described above, as can be readily seen from FIG. 2, a load P is applied to the distal end of each leg bar 10 due to the vibration of the vehicle body, whereby a moment is generated. As the moment is generated, a bending stress is generated in the leg bar 10. Since the leg bar 10 has the uniformly circular cross-section to have the same cross-sectional area and the same section modulus through the entire length thereof, the leg bar 10 has constant rigidity through the entire length thereof. Due to the fact that the leg bar 10 has constant rigidity through the entire length thereof, a stress is concentrated on a bent part 13 of the stabilizer bar 1 where the leg bar 10, in which a torsional stress is generated by the load P applied to the distal end of the leg bar 10, is connected to the parallel bar 11. Therefore, a problem is caused in that, when a load is repeatedly applied to the leg bar 10 for extended periods, the stabilizer bar 1 is likely to be broken at the bent part 13.

BRIEF SUMMARY OF THE INVENTION

Accordingly, the present invention has been made keeping in mind the above problems occurring in the prior art, and an object of the present invention is to provide a tapered stabilizer bar having a continuously changing cross-section whereby a stress generated by a load applied to a leg bar due to the vibration of a vehicle body is not concentrated on the bent part of the stabilizer bar and is distributed over the entire leg bar to prevent the stabilizer bar from being broken at the bent part, and a method for manufacturing the same.

Another object of the present invention is to provide a tapered stabilizer bar having a continuously changing cross-section which allows material for the stabilizer bar to be saved so that the weight of the stabilizer bar decreases, thereby contributing to the reduction in the weight and the manufacturing cost of a vehicle, and a method for manufacturing the same.

In order to achieve the above objects, according to one aspect of the present invention, there is provided a stabilizer bar including a parallel bar which is secured with respect to a frame via fasteners in each of which a bush is fitted, and leg bars which extend from both ends of the parallel bar with distal ends of the leg bars connected to suspension arms, wherein each leg bar is tapered from an upper end toward a lower end thereof to continuously decrease a section modulus of the leg bar from the upper end toward the lower end thereof so that the stress generated by a load applied to the lower end of the leg bar is not concentrated on a bent part of the stabilizer bar and is distributed over the entire leg bar so as to prevent the stabilizer bar from being broken at the bent part.

In order to achieve the above objects, according to another aspect of the present invention, there is provided a method for manufacturing a stabilizer bar for a vehicle, comprising the steps of cutting a stabilizer bar material having a round bar-shaped configuration: heating both end portions of the cut stabilizer bar material which are to be formed as legs of the stabilizer bar; rolling both side surfaces of each of both heated end portions of the stabilizer bar material so that both side surfaces are tapered; rotating the stabilizer bar material about an axis thereof between rollers to taper both remaining non-rolled side surfaces of each of both end portions of the stabilizer bar material which are to be formed as the leg bars of the stabilizer bar, so that each of both end portions of the stabilizer bar material has an elliptical cross-section; forming eyes on distal ends of the stabilizer bar material through forging the distal ends of the stabilizer bar material; and bending the stabilizer bar material into the shape of the stabilizer bar.

As is apparent front the above descriptions, the tapered stabilizer bar having a continuously changing cross-section and a method for manufacturing the same according to the present invention provide advantages in that, since the section modulus of a leg bar gradually decreases from the upper end toward the lower end thereof, the stress generated by a load applied to the lower end of the leg bar is not concentrated on the bent part of the stabilizer bar and is distributed over the entire leg bar to prevent the stabilizer bar from being broken at the bent part. Further, because material for the stabilizer bar can be saved, the weight of the stabilizer bar is decreased, whereby it is possible to contribute to the reduction in the weight and the manufacturing cost of a vehicle.

BRIEF DESCRIPTION OF THE DRAWINGS

FIG. 1 illustrates the steps of a method for manufacturing a conventional stabilizer bar:

FIG. 2 illustrates a state in which the conventional stabilizer bar is mounted in place;

FIGS. 8(A) and 8(B) illustrate views of the processes for rolling the stabilizer bar according to the present invention.

DETAILED DESCRIPTION

Figure 3:
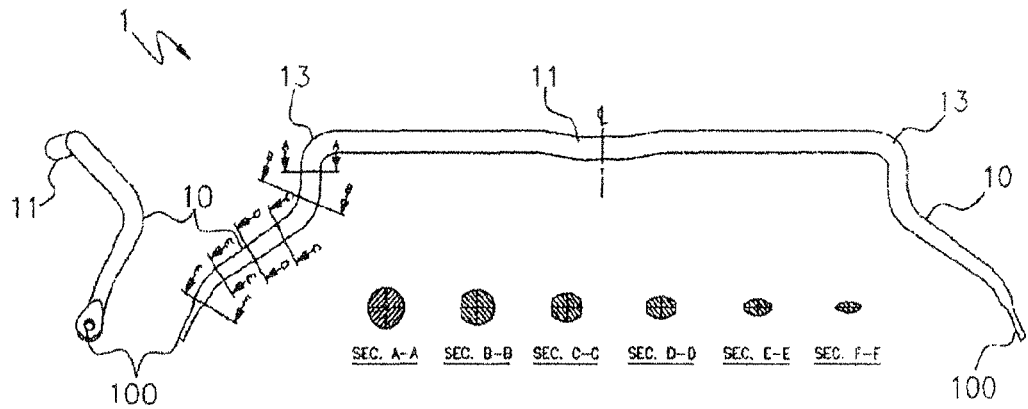
FIG. 3 illustrates front and side views of a stabilizer bar in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to like parts of the stabilizer bar.

Figure 4:
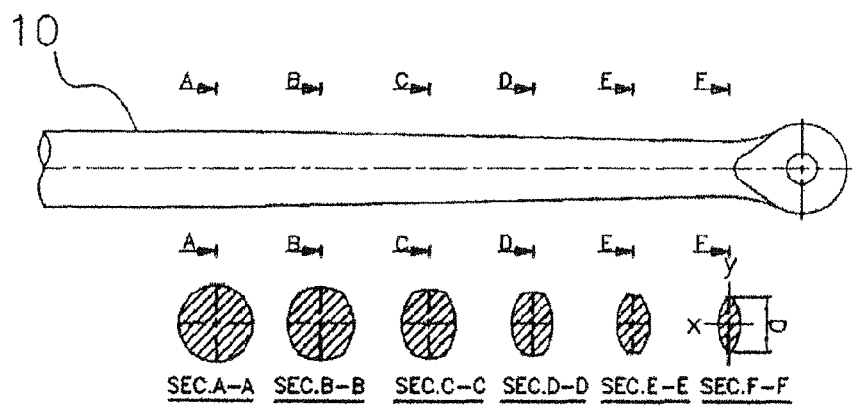
FIG. 4 illustrates a plan view of the leg bar of the stabilizer bar according to an embodiment of the present invention.
Figure 5:
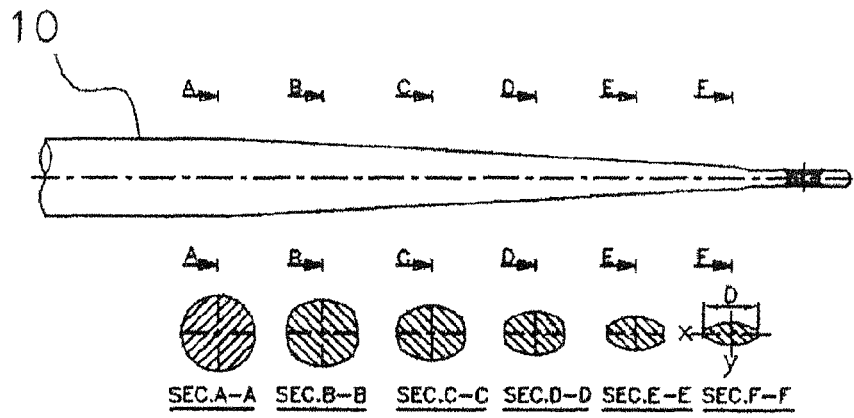
FIG. 5 illustrates a front view of the leg bar of the stabilizer bar according to an embodiment of the present invention.

FIG. 3 provides front and side views illustrating a stabilizer bar in accordance with an embodiment of the present invention, FIG. 4 is a plan view illustrating the leg bar of the stabilizer bar according to an embodiment of the present invention, and FIG. 5 is a front view illustrating the leg bar of the stabilizer bar according to an embodiment of the present invention. As shown in FIG. 3, the stabilizer bar 1 in accordance with the invention comprises a parallel bar 1 having a circular cross-section, leg bars 10 extending from both ends of the parallel bar 11, and eyes 100 formed at the distal ends of the leg bars 10. Each of the leg bars 10 is formed in a manner such that it is tapered from the upper end toward the lower end thereof, that is, from a bent part 13 at which each of the leg bars 10 is connected to the parallel bar 11 to the distal end of the leg bar 10. That is to say, referring to the A-A through F-F cross-sections illustrated in FIG. 3, while the A-A cross-section has a circular shape having the same area as the parallel bar 11, the cross-section of the leg bar 10 gradually approaches to an elliptical shape between the B-B cross-section and the F-F cross-section, and is tapered to have a continuously decreasing cross-sectional area.

Each of the leg bars 10 according to the invention will be described below in more detail with reference to FIGS. 4 and 5. Referring to FIG. 4, when viewed from the top, the A-A cross-section of the leg bar 10 has a circular shape which has the same cross-sectional area as the parallel bar 11, and, between the B-B cross-section and the F-F cross-section, the cross-section of the leg bar 10 approaches to an elliptical shape in which the diameter D measured on the major axis extends on the y-axis, and is tapered to have a continuously decreasing cross-sectional area. Referring to FIG. 5, when viewed from the front, the A-A cross-section of the leg bar 10 has a circular shape which has the same cross-sectional area as the parallel bar 11, and between the B-B cross-section and the F-F cross-section, the cross-section of the leg bar 10 approaches to an elliptical shape in which the diameter D measured on the major axis extends on the x-axis, and is tapered to have a continuously decreasing cross-sectional area.

Figure 6:
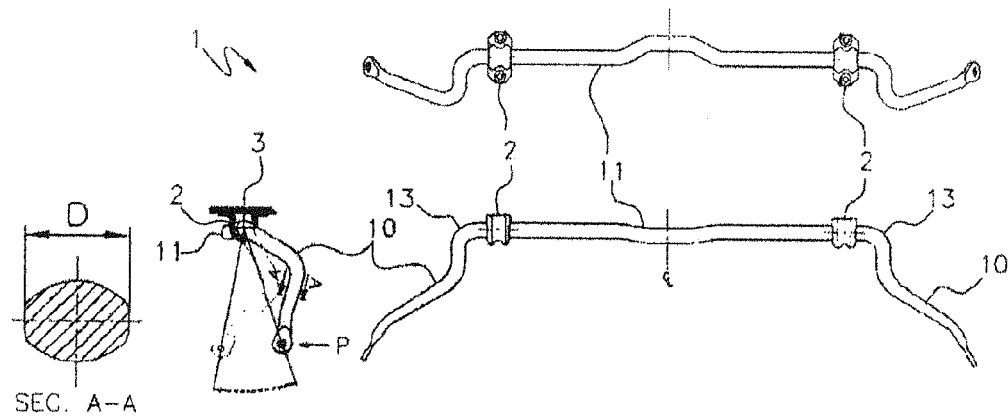
FIG. 6 illustrates a state in which the stabilizer bar according to the present invention is mounted in place.

FIG. 6 illustrates a state in which the stabilizer bar according to the present invention is mounted in place. Referring to FIG. 6, in the stabilizer bar 1 according to this embodiment of the present invention, the parallel bar 11 is secured with respect to a frame 3 via fasteners 2 in each of which a bush is fitted, and the leg bars 10 extend from both ends of the parallel bar 11 with the distal lower ends of the leg bars 10 connected to suspension arms (not shown). A load P generated due to vibration of a vehicle body is applied to the distal lower end of each of the leg bars 10. Each of the leg bars 10 to which the load P is applied is bent in a manner such that the major axis of the elliptical cross-section of each of the leg bars 10 extends in a direction in which the load P is applied to the distal lower end of each of the leg bars 10.

Figure 7:
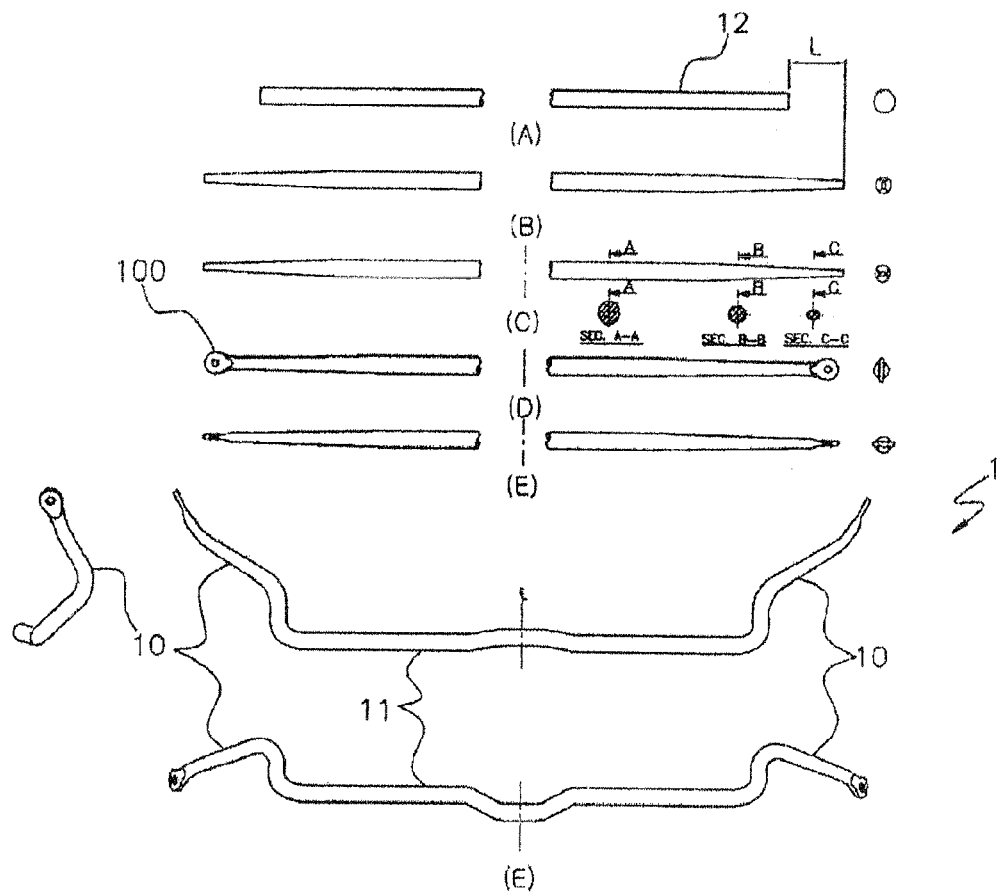
FIGS. 7(A) through 7(E) illustrates views of the steps of a method for manufacturing a stabilizer bar in accordance with another embodiment of the present invention.

FIGS. 7(A) through 7(E) are views illustrating the steps of a method for manufacturing a stabilizer bar in accordance with another embodiment of the present invention, and FIGS. 8(A) and 8(B) are views illustrating the processes for rolling the stabilizer bar according to the present invention. Referring to FIG. 7(A), in the manufacture of the stabilizer bar 1 according to the invention, a stabilizer bar material 12 having a round bar-shaped configuration is first cut. Then, both end portions of the cut stabilizer bar material 12 which are to be formed as the leg bars 10 of the stabilizer bar 1 are heated. Next, both heated end portions of the stabilizer bar material 12 which are to be formed as the leg bars 10 of the stabilizer bar 1 are rolled such that both heated end portions of the stabilizer bar material 12 are tapered toward the distal lower ends thereof as shown in FIGS. 7(B) and 7(C). That is to say, each of both heated end portions of the stabilizer bar material 12 is placed between upper and lower rolling rollers 4 and 4a and is then rolled on both side surfaces thereof as shown in FIG. 8(A) so that both side surfaces are tapered. Thereupon, the stabilizer bar material 12 is rotated about the axis S thereof as shown in FIG. 8(B). That is to say, each of both end portions of the stabilizer bar material 12 which are to be formed as the leg bars 10 inserted between the upper and lower rollers 4 and 4a to taper both remaining non-rolled side surfaces of each of both end portions of the stabilizer bar material 12, so that each of both end portions of the stabilizer bar material 12 has an elliptical cross-section. After both end portions of the stabilizer bar material 12 which are to be formed as the leg bars 10 are rolled, eyes 100 are formed on the distal lower ends of the stabilizer bar material 12 as shown in FIGS. 7(D) and 7(E) through forging. Thereafter, as shown in FIG. 7(F), the stabilizer bar material 12 is bent into the shape of the stabilizer bar 1. In this way, the manufacturing procedure of the stabilizer bar 1 is completed.

The stabilizer bar material 12 having the round bar-shaped configuration is increased, in its length as both end portions of the stabilizer bar material 12 are rolled. In consideration of this fact, the stabilizer bar material 12 having the round bar-shaped configuration is cut to have a length shorter than that of the finally manufactured stabilizer bar 1 by a length L as shown in FIG. 7(A) which increases due to the rolling of both end portions of the stabilizer bar material 12.

It is preferred that each of both end portions of the stabilizer bar material 12, which are rolled as the leg bars 10 having the elliptical cross-section, is bent in a manner such that the diameter D measured on the major axis extends in a direction in which the load P is applied to the distal lower end of each leg bar 10 due to vibration of a vehicle body.

Hereafter, operation of the stabilizer bar according to the present invention will be described with reference to FIG. 6.

As shown in FIG. 6, the stabilizer bar 1 generally comprises the parallel bar 11 and the leg bars 10. The parallel bar 11 is secured with respect to the frame 3 via the fasteners 2 in each of which a bush is fitted, and the leg bars 10 extend from both ends of the parallel bar 11 with the distal ends of the leg bars 10 connected to a suspension (not shown). As the load P generated due to vibration of the vehicle body is applied to each of the distal lower ends of the leg bars 10 which are connected to the suspension arms, a bending stress is generated in the leg bars 10, and a torsion stress is generated in the bent part 13 at which each of the leg bars 10 is connected to the parallel bar 11. At this time, if the cross-sectional area of each of the leg bars 10 is constant through the entire length of the leg bar 10, because the leg bar 10 has the same section modulus through the entire length, the leg bar 10 has constant rigidity through the entire length. If the leg bar 10 has constant rigidity through the entire length, as a stress is concentrated on the bent part 13 at which the leg bar 10 is connected to the parallel bar 11 and to which a torsional load is applied due to the load P applied to the distal end of the leg bar 10, when the load P is repeatedly applied to the leg bar 10 for extended periods, the stabilizer bar 1 is likely to be broken at the bent part 13. However, in the stabilizer bar 1 according to the invention, since each of the leg bars 10 is formed to be tapered from the upper end toward the lower end thereof, the section modulus of each of the leg bars 10 continuously decreases from the upper end toward the lower end of the leg bar 10. Due to the fact that a stress generated in the leg bar 10 is inversely proportional to the section modulus, as the section modulus of the leg bar 10 continuously decreases from the upper end toward the lower end of the leg bar 10, the stress increases from the upper end toward the lower end of the leg bar 10. As the stress increases from the upper end toward the lower end of the leg bar 10, the stress generated due to the load applied to the distal end of the leg bar 10 is not concentrated on the bent part 13 and is distributed over the entire leg bar 10, whereby it is possible to prevent the stabilizer bar 1 from being broken at the bent part 13.

Also, in the stabilizer bar 1 according to the present invention, since each of the leg bars 10 is formed through rolling, the stabilizer bar material 12 can be saved by an amount corresponding to a length L of the leg bar 10 which increases clue to rolling. Therefore, as the weight of the stabilizer bar 1 decreases, it is possible to contribute to the reduction in the weight and the manufacturing cost of a vehicle.

As is apparent from the above descriptions, the tapered stabilizer bar having a continuously changing cross-section and a method for manufacturing the same according to the present invention provide advantages in that, since the section modulus of a leg bar gradually decreases from the upper end toward the lower end thereof, the stress generated by a load applied to the lower end of the leg bar is not concentrated on the bent part of the stabilizer bar and is distributed over the entire leg bar to prevent the stabilizer bar from being broken at the bent part. Further, because material for the stabilizer bar can be saved, the weight of the stabilizer bar is decreased, whereby it is possible to contribute to the reduction in the weight and the manufacturing cost of a vehicle.

Although preferred embodiments of the present invention have been described for illustrative purposes, those skilled in the art will appreciate that various modifications, additions and substitutions are possible, without departing from the scope and spirit of the invention as disclosed in the accompanying claim.

The invention claimed is:

1. A method for manufacturing a stabilizer bar for a vehicle, comprising the steps of:
   cutting a stabilizer bar material having a round bar-shaped configuration;
   heating end portions of the cut stabilizer bar material which are to be formed as leg bars of the stabilizer bar;
   rolling side surfaces of each of the heated end portions of the stabilizer bar material between rollers so that the side surfaces are tapered;
   rotating the stabilizer bar material about an axis thereof between the rollers to taper remaining non-rolled side surfaces of the end portions of the stabilizer bar material which are to be formed as the leg bars of the stabilizer bar, so that the end portions of the stabilizer bar material have an elliptical cross-section;
   forming eyes on distal ends of the stabilizer bar material through forging the distal ends of the stabilizer bar material; and
   bending the stabilizer bar material into the shape of the stabilizer bar.

2. The method as set forth in claim 1, wherein the stabilizer bar material having the round bar-shaped configuration is cut to have a length shorter than a final length of the stabilizer bar material, the final length being longer due to the rolling of the end portions of the stabilizer bar material.

3. The method as set forth in claim 1, wherein each of the end portions of the stabilizer bar material, which are rolled as the leg bars of the stabilizer bar having the elliptical cross-section, is bent in order to have a major axis extending in a direction in which to support a load when applied to the distal end of each leg bar due to vibration of a vehicle body.

* * * * *